(12) United States Patent
Costabeber (10) Patent No.: US 10,723,066 B2
(45) Date of Patent: Jul. 28, 2020

(54) CARTRIDGE FOR FEEDING A STEREOLITHOGRAPHY MACHINE, STEREOLITHOGRAPHY MACHINE COMPRISING SAID CARTRIDGE AND STEREOLITHOGRAPHY METHOD EMPLOYING SAID MACHINE

(71) Applicant: Ettore Maurizio Costabeber, Zane (IT)

(72) Inventor: Ettore Maurizio Costabeber, Zane (IT)

( * ) Notice: Subject to any disclaimer, the term of this patent is extended or adjusted under 35 U.S.C. 154(b) by 853 days.

(21) Appl. No.: 14/904,217

(22) PCT Filed: Jul. 16, 2014

(86) PCT No.: PCT/IB2014/001332
§ 371 (c)(1),
(2) Date: Jan. 11, 2016

(87) PCT Pub. No.: WO2015/015261
PCT Pub. Date: Feb. 5, 2015

(65) Prior Publication Data
US 2016/0151974 A1 Jun. 2, 2016

(30) Foreign Application Priority Data
Jul. 30, 2013 (IT) ............................... VI2013A0197

(51) Int. Cl.
*B29C 64/124* (2017.01)
*B29C 64/259* (2017.01)
(Continued)

(52) U.S. Cl.
CPC ........ *B29C 64/124* (2017.08); *B01F 15/0087* (2013.01); *B29C 64/259* (2017.08);
(Continued)

(58) Field of Classification Search
CPC ...... B29C 64/124; B29C 64/259; B33Y 10/00; B33Y 30/00; B29K 2105/0058; B01F 15/00863; B01F 15/0087
See application file for complete search history.

(56) References Cited

U.S. PATENT DOCUMENTS

| | | | | |
|---|---|---|---|---|
| 4,946,100 A | * | 8/1990 | Flemming | B01F 13/1055 239/1 |
| 5,011,635 A | * | 4/1991 | Murphy | B29C 64/135 264/401 |

(Continued)

FOREIGN PATENT DOCUMENTS

| | | |
|---|---|---|
| WO | WO 2012/111655 A1 | 8/2012 |
| WO | WO 2016/200016 A1 * | 12/2016 |

OTHER PUBLICATIONS

PCT International Search Report corresponding to International Application No. PCT/IB2014/001332, date of completion of the International Search—Oct. 31, 2014.

(Continued)

*Primary Examiner* — Charles Cooley
(74) *Attorney, Agent, or Firm* — Volpe and Koenig, P.C.

(57) ABSTRACT

A cartridge for a stereolithography machine, comprising a supporting structure suited to be removably associated with the stereolithography machine, a container provided with an access opening and associated with the supporting structure, and a first reservoir associated with the supporting structure for containing a first material, liquid or pasty, suited to solidify following exposure to a predefined radiation. The cartridge also includes a second reservoir associated with the supporting structure for containing a second material, liquid or pasty, different from the first material, a conveyance associated with the supporting structure to convey the first material and the second material from the reservoirs towards the container.

15 Claims, 5 Drawing Sheets

(51) Int. Cl.
*B01F 15/00* (2006.01)
*B33Y 10/00* (2015.01)
*B33Y 30/00* (2015.01)
*B29K 105/00* (2006.01)

(52) U.S. Cl.
CPC ....... *B29K 2105/0058* (2013.01); *B33Y 10/00* (2014.12); *B33Y 30/00* (2014.12)

(56) References Cited

U.S. PATENT DOCUMENTS

| | | | | | |
|---|---|---|---|---|---|
| 5,174,931 | A | * | 12/1992 | Almquist | B29C 41/12 264/401 |
| 5,503,793 | A | | 4/1996 | Uchinono et al. | |
| 5,525,051 | A | * | 6/1996 | Takano | B29C 64/135 264/401 |
| 5,573,721 | A | * | 11/1996 | Gillette | B29C 41/12 264/401 |
| 9,555,584 | B2 | * | 1/2017 | Costabeber | B29C 64/20 |
| 10,022,913 | B2 | * | 7/2018 | Costabeber | B29C 64/135 |
| 2005/0185034 | A1 | * | 8/2005 | Anma | B41J 2/17546 347/86 |
| 2015/0056320 | A1 | * | 2/2015 | Costabeber | B29C 64/106 425/169 |
| 2015/0165678 | A1 | * | 6/2015 | Ding | B33Y 30/00 425/150 |
| 2015/0298461 | A1 | * | 10/2015 | Koganehira | B41J 2/17509 347/7 |
| 2016/0151974 | A1 | * | 6/2016 | Costabeber | B29C 64/259 264/401 |
| 2017/0136710 | A1 | * | 5/2017 | Costabeber | B33Y 40/00 |

OTHER PUBLICATIONS

PCT Written Opinion of the International Searching Authority corresponding to International Application No. PCT/IB2014/001332, date of completion of opinion—Oct. 31, 2014.
English language translation of abstract of WO2012111655 (A1).

* cited by examiner

CARTRIDGE FOR FEEDING A STEREOLITHOGRAPHY MACHINE, STEREOLITHOGRAPHY MACHINE COMPRISING SAID CARTRIDGE AND STEREOLITHOGRAPHY METHOD EMPLOYING SAID MACHINE

The present invention concerns a cartridge for feeding a stereolithography machine, as well as a stereolithography machine using said cartridge.

The present invention also concerns a stereolithography method employing said stereolithography machine.

As is known, the stereolithography technique makes it possible to produce a three-dimensional object by superimposing a plurality of layers of a material, liquid or pasty, that is solidified following exposure to a predefined radiation, generally of the luminous type.

A stereolithography machine of the known type comprises a container suited to contain the material and a modelling platform motorized so that it moves in the vertical direction.

The machine furthermore comprises emitter means suited to emit said predefined radiation, which are capable of selectively solidifying a layer of the material adjacent to the modelling platform.

Different examples of stereolithography machines of the known type are described in documents U.S. Pat. Nos. 5,573,721, 5,503,793 and WO 2012/111655.

Different stereolithography materials are known which can be used to make the object and differ from one another in terms of colour, hue, mechanical characteristics and other physical parameters.

The same stereolithography machine can be used with any of the different materials mentioned above, depending on the requirements to be met for each three-dimensional object to be obtained.

Analogously, it is possible to use different materials for different areas of a single three-dimensional object.

According to the known art, it is the operator who prepares the machine with the desired materials.

The operation just described above poses the drawback that it requires time and is relatively uncomfortable to carry out.

The stereolithography machines of the known type furthermore pose the drawback that the periodic topping up of the materials used is required in order to restore their level.

According to the known technique, said topping up is carried out manually, with the drawback that it requires more time and exposes the operator to risks deriving from the possible toxicity of the material.

According to a known variant embodiment, the topping up operation is carried out automatically, but in this case the stereolithography machine must be provided with a feeding device, which involves a cost and requires maintenance.

A further drawback of this variant embodiment derives from the fact that, if it is necessary to change the material, said feeding device must be previously cleaned in such a way as to prevent the old material from contaminating the new material.

In any case, the machines described above pose the further drawback that the material that remains in the container at the end of the processing cycle is exposed to the atmospheric agents, in particular to the air and light of the environment, with the consequence that it progressively deteriorates until it becomes unusable.

To avoid said deterioration, it is necessary to manually transfer the remained material into a closable container and keep it there until it has to be used again.

However, this operation poses drawbacks that are completely analogous to those already described with regard to the manual topping up of the container.

A further inconvenience takes place in the stereolithography machines of the known type in which the means emitting the predefined radiation irradiate the material through the bottom of the container, which in this case is transparent.

In these machines it happens that during the processing cycle the transparent bottom of the container is subjected to a progressive opacifying action due to the passage of the predefined radiation through it.

Said opacifying action progressively reduces the effectiveness of the radiation, until it becomes necessary to replace the container.

The determination of the time when it is necessary to carry out said replacement requires a certain amount of expertise.

The difficulties related to the operations required to top up and empty the container, to periodically replace the container and to clean the feeding system if necessary imply that a machine of the type described above is not suited to be used by an inexpert user.

The present invention aims to overcome all the drawbacks which are typical of the stereolithography machines of the known type described above.

In particular, it is a first object of the present invention to make it easier for the operator to use different materials in the same stereolithography machine.

It is a further object of the invention to eliminate the need to periodically top up and/or empty the container.

It is also the object of the invention to avoid the need to clean the container's feeding system.

It is also the object of the invention to facilitate the replacement of the container when the bottom of the container has become opaque.

It is another, yet not the least object of the invention to avoid the deterioration of the material that has remained at the end of the processing cycle.

The above mentioned objects are achieved by a cartridge for a stereolithography machine constructed according to claim 1.

Said objects are also achieved by a stereolithography machine comprising said cartridge, according to claim 14, as well as by a stereolithography method according to claim 16.

Further characteristics and details of the various aspects of the invention are described in the corresponding dependent claims.

Advantageously, the cartridge that is the subject of the invention makes it possible to change the material in a simpler way compared to the stereolithography machines of the known type.

Still advantageously, the cartridge of the invention facilitates the production of three-dimensional objects with different materials for different areas of the object.

Still advantageously, said cartridge is particularly suited to be used even by an inexpert operator like, for example, an operator of the goldworking or dentistry sector.

The said objects and advantages, together with others which will be highlighted below, are illustrated in the descriptions of some preferred embodiments of the invention which are provided by way of non-limiting examples with reference to the attached drawings, wherein.

Figure 1:
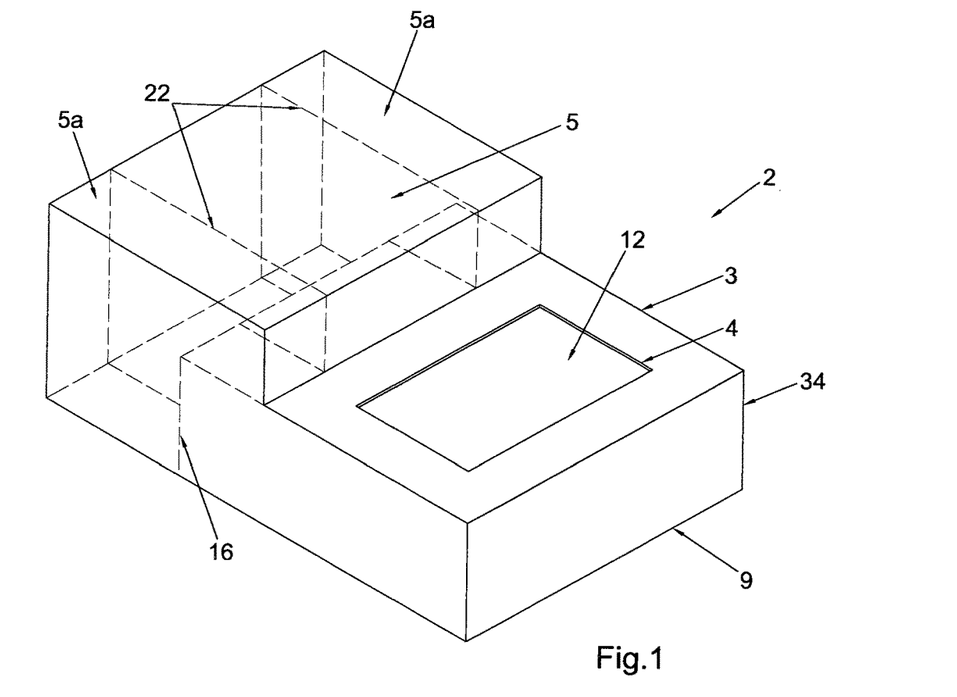
FIG. 1 shows an axonometric view of the cartridge that is the subject of the invention.

The cartridge for feeding a stereolithography machine that is the subject of the invention, indicated as a whole by 2 in FIG. 1, comprises a supporting structure 34 with which a container 3 is associated.

The cartridge 2 also comprises a first reservoir 5 associated with the supporting structure 34 and suited to contain a first material 6, liquid or pasty, suited to solidify following exposure to a predefined radiation 7.

The predefined radiation 7 is preferably but not necessarily light.

Still preferably, said first material 6 is a light-curing resin or a photopolymer.

The cartridge 2 comprises also feeding means 8 associated with the supporting structure 34, suited to convey the first material 6 from the first reservoir 5 towards the container 3.

Figure 4:
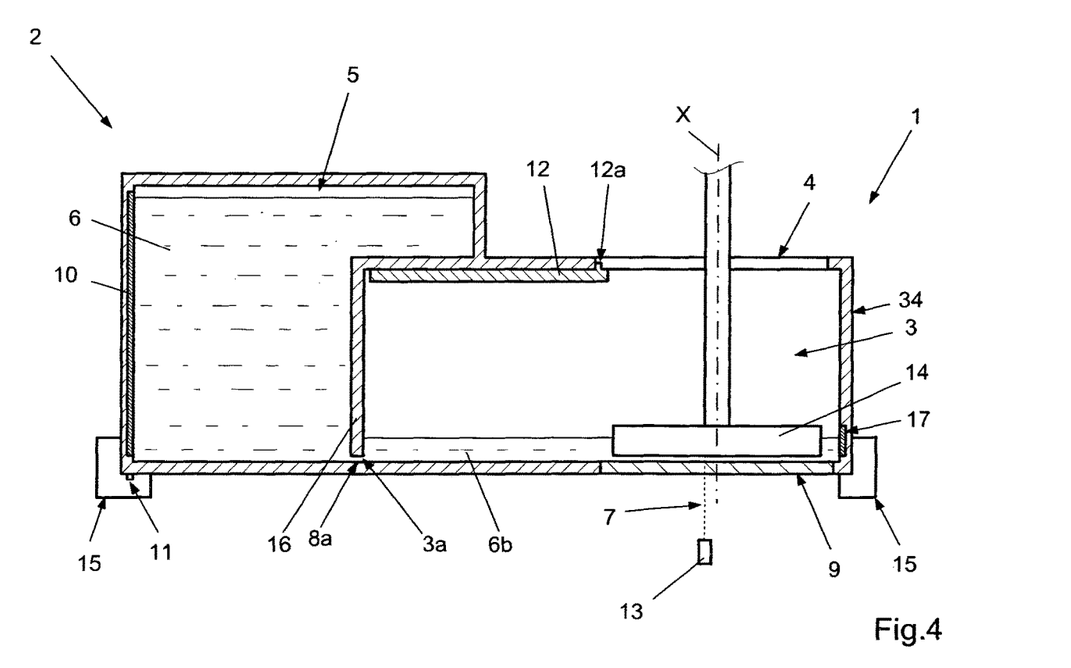
FIG. 4 shows the cartridge of FIG. 3 during use in a stereolithography machine.

The supporting structure 34 is provided with means for removable connection to a stereolithography machine 1, schematically shown in FIG. 4.

The stereolithography machine 1 is provided with removable connection means 15 suited to cooperate with said means for connecting the cartridge 2, in such a way as to define for the latter an operating position shown in FIG. 4.

The container 3 is furthermore provided with an access opening 4 suited to allow the insertion of the modelling platform 14 of the stereolithography machine 1 in the container 3 itself, when the cartridge 2 is connected to said stereolithography machine, as shown in FIG. 4.

It can be understood that the coupling of the cartridge 2 to the machine 1 makes a container 3 available which is suited to contain the first material 6 that, when selectively subjected to the predefined radiation 7, solidifies and thus gives a shape to the three-dimensional object.

Advantageously, said cartridge 2 can be easily coupled to the machine 1 and replaced when needed.

Obviously, it is possible to make different cartridges with structures that are analogous to one another and, therefore, all equally suited to be connected to the machine 1, but different from one another for the material they contain.

Therefore, advantageously, the operator can choose from time to time the cartridge containing the material that is most suited to the specific three-dimensional object to be made.

According to the invention, the cartridge 2 comprises also a second reservoir 5a, associated with the supporting structure 34, suited to contain a second liquid or pasty material 6a different from said first material 6.

The two reservoirs 5 and 5a are shown in FIG. 1 with a dashed line schematically indicating their outlines within the supporting structure 34. The reservoirs are laterally juxtaposed and are located at one end of the container 3 as seen in the Figures The feeding means 8 are suited to convey also the second material 6a from the second reservoir 5a towards the container 3.

It can be understood that the presence of several different materials 6, 6a in a single cartridge 2 makes it possible to produce three-dimensional objects that consist of several different materials.

Furthermore, as the operator can, with a single operation, connect to the stereolithography machine 1 the cartridge that is most suitable for the type of product to be obtained, the preparation of the stereolithography machine 1 is simpler and quicker compared to the machines of the known type.

Obviously, a specific cartridge can be made for each type of three-dimensional object to be produced, containing the materials that are most suitable for that type of object.

Furthermore, the feeding means 8 make it possible to transfer the materials 6, 6a into the container 3 when it is necessary to use them for the processing cycle, thus avoiding any need to top up the container 3 from the outside and thus achieving one of the objects of the invention.

Furthermore, advantageously, the cartridge 2 described above does not require the presence of automatic feeding devices on the machine, which thus simplifies both the stereolithography machine 1 and the use of the same.

Furthermore, the invention achieves the object to avoid the need to wash the feeding means 8 each time the material is changed, as they are replaced together with the cartridge 2 each time the material is changed.

Preferably, the second material 6a is of the type suited to solidify following exposure to said predefined radiation 7.

In this way, the two materials 6, 6a can be used as an alternative to each other, according to the production needs.

According to a variant embodiment of the invention, the second material 6a is of the type suited to be mixed with the first material 6 in such a way as to form a mixture 6b that is suited to solidify following exposure to said predefined radiation 7.

In the variant embodiment just described above, the first material 6 serves as a base material for the formation of the solidified layers of the three-dimensional object, while the second material 6a serves as an auxiliary material to form, together with the base material 6, a mixture 6b having different physical properties compared to the base material 6.

Said second material 6a can be, for example, a pigment, in the case where it is necessary to obtain a mixture 6b with different colour shades, hues or other visual properties.

Said second material 6a may also contain powders, for example ceramic particles, suited to give the mixture 6b special mechanical characteristics like resistance, hardness and the like.

Preferably, the feeding means 8 are suited to be controlled in such a way that they can dispense the first material 6 and the second material 6a in variable percentages, so as to obtain corresponding mixtures 6b with different properties.

Figure 2:
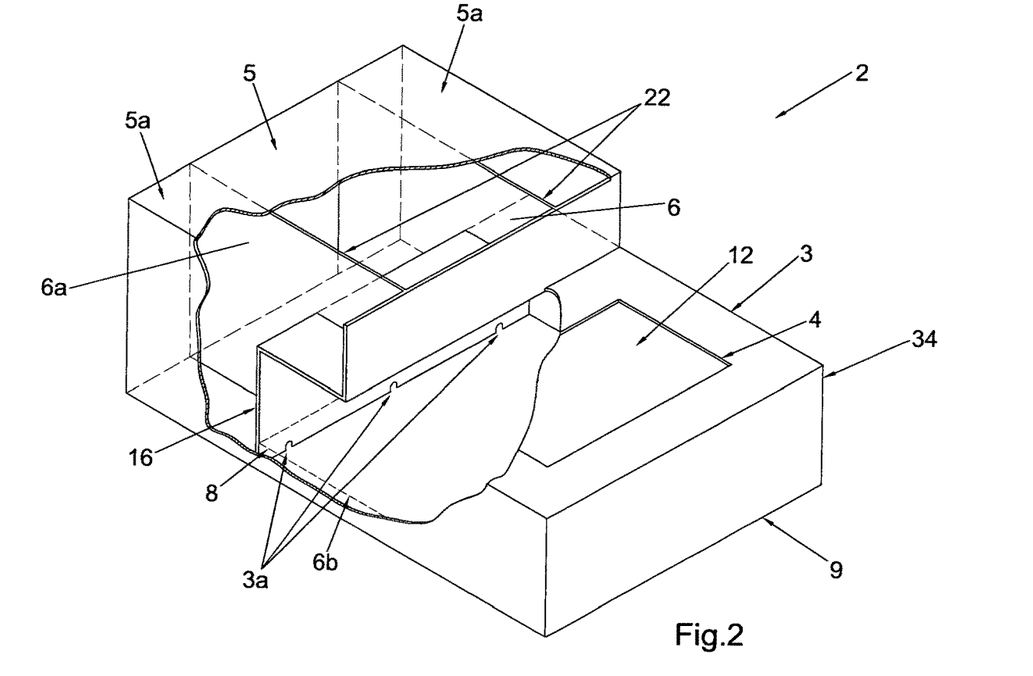
FIG. 2 shows a partial section view of the cartridge shown in FIG. 1.

Preferably, and as can be observed in FIGS. 1 and 2, the cartridge 2 contains two second reservoirs 5a, each one of which is suited to contain corresponding second materials 6a different from each other.

Advantageously, the presence of two or more second reservoirs 5a, each containing a different material 6a, allows greater flexibility in the use of the machine 1, both in the case where the materials are used individually and in the case where they are used mixed together.

Preferably, the reservoirs 5 and 5*a* and the container 3 are fixedly associated with each other through the supporting structure 34, in such a way as to form a single piece.

Even more preferably, the supporting structure 34 is configured in such a way as to define the reservoirs 5 and 5*a* and the container 3.

Figure 3:
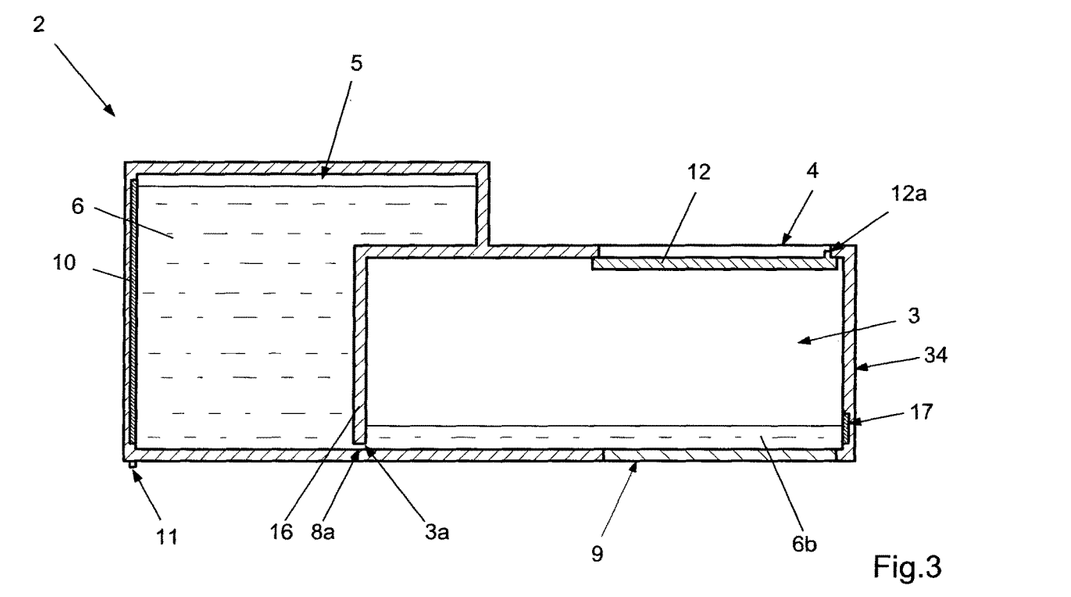
FIG. 3 shows a side sectional view of the cartridge shown in FIG. 1.

More precisely, and as shown in FIGS. 2 and 3, the supporting structure 34 preferably comprises an external wall that delimits a containment volume, an intermediate wall 16 positioned inside said containment volume and intended to separate the container 3 from the reservoirs 5, 5*a*, and intermediate partitions 22 positioned inside the containment volume and intended to separate the first reservoir 5 and the second reservoirs 5*a* from one another.

Preferably, and as shown in FIG. 3, the container 3 has a bottom 9 at least partially transparent to the predefined radiation 7 and opposite the access opening 4 of the container 3.

The configuration of the access opening 4 and of the transparent bottom 9 makes it possible to use the cartridge 2 in a stereolithography machine 1 of the type schematically shown in FIG. 4, in which the predefined radiation 7 is irradiated by the emitter means 13 arranged under the container 3.

In fact, the transparent bottom 9 allows the passage of the predefined radiation 7 to obtain the solidification of the material 6*b* contained in the container 3.

Furthermore, the access opening 4 makes it possible to insert the modelling platform 14 in the container 3 and to move it so as to allow the stereolithography process to be carried out.

Preferably, the reservoirs 5, 5*a* are provided with means suited to insulate the materials 6, 6*a* contained in them from the external environment.

Advantageously, said insulation makes it possible to protect the materials 6, 6*a* from the air and/or light of the environment.

Preferably, said insulation means comprise tight walls that delimit the reservoirs 5, 5*a*.

In particular, the walls of the reservoirs 5, 5*a* are preferably opaque to the light of the environment.

Concerning the feeding means 8, they comprise conveyance ducts 8*a*, each communicating at a first end with a corresponding reservoir 5, 5*a* and at the second opposite end with the reservoir 3 through a corresponding dispensing mouth 3*a*, visible in FIG. 2, distinct from the dispensing mouths 3*a* corresponding to the other reservoirs.

The presence of a dispensing mouth 3*a* for each reservoir 5, 5*a* makes it possible to prevent the materials 6, 6*a* contained in the reservoirs 5, 5*a* from mixing together before they reach the container 3.

In this way, advantageously, it is possible to control with precision the composition of the material 6*b* that is transferred into the container 3.

Preferably, and as shown in FIG. 3, said conveyance ducts 8*a* are corresponding through openings belonging to the intermediate wall 16 that separates the container from the reservoirs 5, 5*a*.

Preferably, the feeding means 8 are configured in such a way as to maintain the level of the material 6*b* in the container 3 within a predefined interval, independently of the level of the materials 6, 6*a* present in the reservoirs 5, 5*a*.

Advantageously, this makes it possible to constantly maintain the level in the container 3 at an optimal value for processing, at the same time avoiding possible leakages of the material 6*b* through the container 3.

Preferably, this is obtained by suitably sizing each conveyance duct 8*a*.

In particular, the conveyance ducts 8*a* can be sized precisely, in such a way as to allow the spontaneous outflow of the materials 6, 6*a* from the corresponding reservoirs 5, 5*a* when the level in the container 3 lowers, then stopping the outflow once said level has been restored to its normal value.

The effect described above can be obtained, for example, by sizing the conveyance ducts 8*a* in such a way as to exploit the different pressures acting on the material 6, 6*a* present in the reservoirs 5, 5*a* and in the container 3, as well as capillarity through the conveyance ducts 8*a*.

Figure 5:
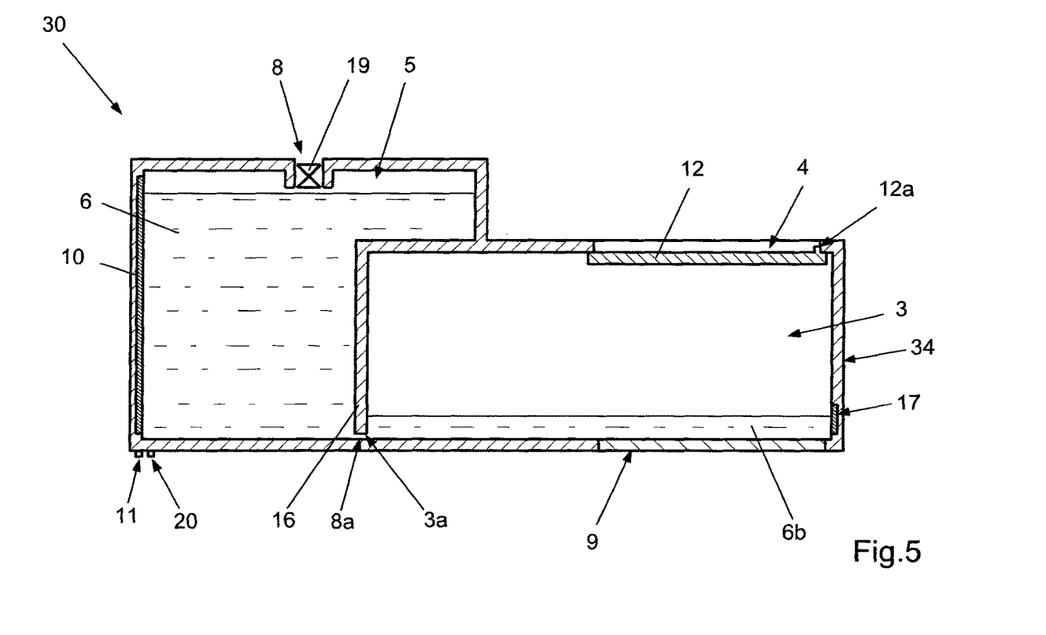
FIG. 5 shows a side sectional view of a first variant embodiment of the cartridge that is the subject of the invention.

According to a variant embodiment of the invention shown in FIG. 5 and therein indicated by 30, said feeding means 8 comprise valve means 19 that can be controlled in such a way as to allow or prevent the outflow of the materials 6, 6*a* from the respective reservoirs 5, 5*a* towards the container 3 based on the level of the material 6*b* present in the latter.

Preferably, said valve means 19 comprise breather valves suited to allow air to get into one or more reservoirs 5, 5*a*.

According to a variant embodiment of the invention not illustrated herein, the valve means are arranged along the conveyance ducts 8*a* so that they can be opened and closed according to the needs.

Figure 6:
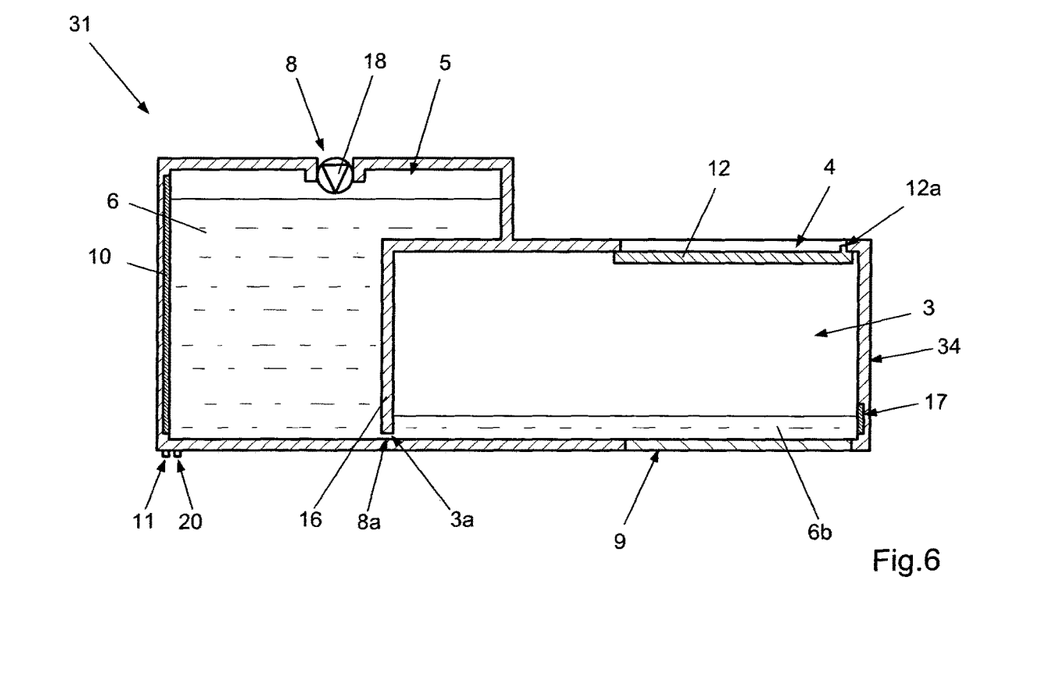
FIG. 6 shows a side sectional view of a second variant embodiment of the cartridge that is the subject of the invention.

According to a further variant embodiment of the invention, illustrated in FIG. 6 and therein indicated by 31, the feeding means 8 comprise a thrusting device 18 suited to thrust the materials 6, 6*a* from the reservoirs 5, 5*a* towards the container 3.

In particular, said thrusting device 18 is configured so that its action is inhibited as long as the level of the material 6*b* in the container 3 remains within said predefined interval.

Preferably but not necessarily, said thrusting device 18 comprises a pump.

According to a variant embodiment of the invention not illustrated herein, the thrusting device comprises a plunger arranged in each reservoir 5, 5*a*.

Preferably, the cartridges 30 and 31 comprise power means 20 suited to supply electric power to the valve means 19 and/or the thrusting device 18, respectively.

Preferably, said power means 20 comprise a power supply connector that can be associated with an analogous connector belonging to the stereolithography machine 1.

According to further variant embodiments of the invention, not illustrated herein, the feeding means 8 comprise a hole suited to be closed and to allow external control means configured so as to control the outflow of the materials 6, 6*a* towards the container 3 to be removably connected to the reservoirs 5, 5*a*.

Said external control means may comprise, for example, valve means and/or thrusting devices analogous to those described above.

In particular, the control means may belong to the stereolithography machine 1.

Obviously, variant embodiments of the invention may comprise any combination of the above described feeding means.

Furthermore, in all the embodiments described above, the feeding means 8 may comprise sensors 17 suited to detect the level of the material 6*b* present in the container 3 and configured so as to indicate any abnormal level.

Preferably, the sensors 17 are operatively connected to the valve means 19 and/or to the thrusting device 18 in such a way as to control their action.

Preferably, the cartridge 2 comprises also detection means 10 suited to detect the level of the materials 6, 6a contained in the reservoirs 5, 5a.

Said detection means 10 make it possible to signal the depletion of the materials 6, 6a contained in the reservoirs 5, 5a, so that at the suitable moment the operator can replace the cartridge 2.

Advantageously, the detection means 10 further facilitate the use of the stereolithography machine 1.

Obviously, said detection means 10 can be advantageously used also in cartridges 2 incorporated in a stereolithography machine in order to signal that the reservoirs 5, 5a need topping up.

Preferably, the detection means 10 are configured in such a way as to emit electric signals representative of the levels of the materials 6, 6a present in the reservoirs 5, 5a.

Said electric signals are preferably transmitted to a device that is external to the cartridge 2 through connection means 11 that may comprise, for example, a first connector suited to be removably connected to a second connector belonging to the stereolithography machine 1.

The stereolithography machine 1 is preferably provided with signalling means, not illustrated herein but known per se, configured in such a way as to warn the operator that the materials 6, 6a have run out in the respective reservoirs 5, 5a on receipt of said electric signal.

Preferably, the cartridge 2 comprises also a door 12 removably associated with the access opening 4 of the container 3 in such a way that it can assume a closed position, shown in FIG. 3, and an open position, shown in FIG. 4.

Advantageously, closing said door 12 means insulating the contents of the cartridge 2 completely from the external environment, for example during the periods when the cartridge remains unused, in such a way as to preserve the materials 6, 6a, and thus achieving the object to avoid their deterioration.

Still advantageously, said door 12 prevents the operator from coming accidentally into contact with the materials 6, 6a, to the benefit of safety and ease of use of the cartridge 2.

Preferably, the door 12 is motorized, so that it spontaneously assumes the closed position.

Said motorization can be obtained, for example, through elastic means.

According to a variant embodiment, the motorization is obtained by means of a closing device belonging to the stereolithography machine 1.

In this case, means suited to block the door 12 in the closed position can be provided, which are suited to prevent the operator from opening said door.

Said requirement can be met, for example, by configuring said blocking means so that they can be released only through a device operated automatically by the stereolithography machine 1 before starting the processing cycle.

In any case, the door 12 preferably comprises a shaped portion 12a suited to define the ends of stroke corresponding to said open and closed positions.

Preferably but not necessarily, the volume of each reservoir 5, 5a is included between 1 cm$^3$ and 50 cm$^3$.

The volume indicated above corresponds to the quantity of material 6, 6a necessary to produce a dental model of the type used in dental mechanics.

Therefore, advantageously, a cartridge 2 with reservoirs 5, 5a in the sizes indicated above can be used as a disposable cartridge, further simplifying the use of the machine for an unskilled operator, while at the same time limiting the quantity of material 6, 6a to the indispensable minimum.

Clearly, the reservoirs 5, 5a can have different volumes.

For example, if the first material 6 serves as a base and the second materials 6a are auxiliary materials, the second reservoirs 5a will probably have smaller volumes compared to the volume of the first reservoir 5.

With regard to the transparent bottom 9 of the container 3, this is preferably configured so that the energy in the form of the predefined radiation 7 which causes it to opacify does not exceed 110% of the energy in the form of the same predefined radiation 7 necessary to solidify a quantity of material 6, 6a corresponding to the overall volume of the reservoirs 5, 5a.

In this way, the duration of the transparent bottom 9 is adapted to the material 6, 6a contained in the cartridge 2, with the advantage of limiting the cost of the transparent bottom 9 and, thus, of the cartridge 2.

Preferably, the cartridge 2 is provided with holes for filling the reservoirs 5, 5a, which are sealed once the filling operation has been completed.

Preferably, the door 12 is configured in such a way as to ensure that the cartridge 2 remains completely tight at least until the door is opened for the first time.

Figure 7:
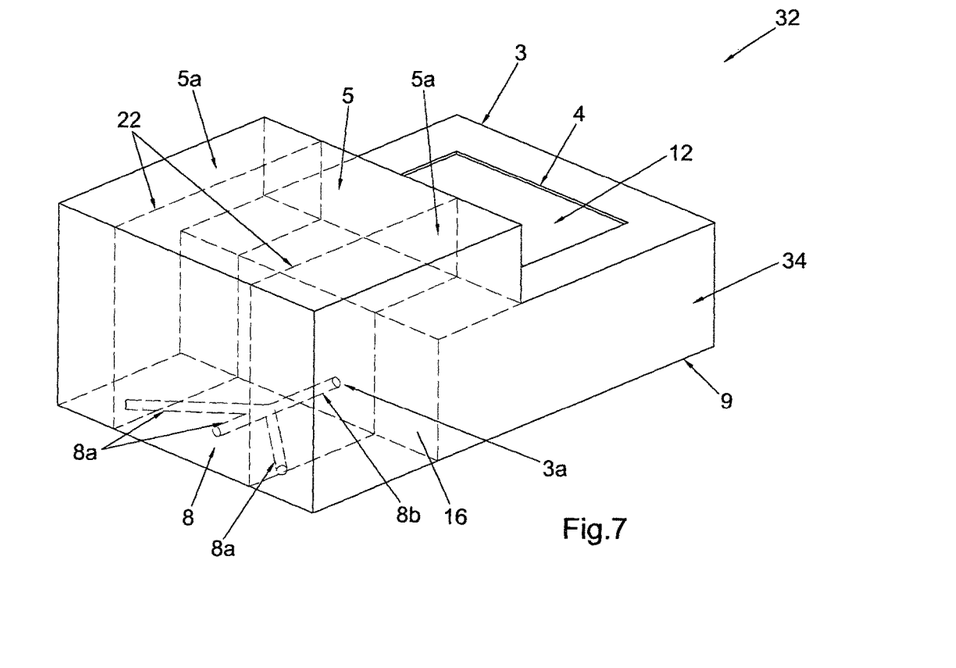
FIG. 7 shows an axonometric view of a third variant embodiment of the cartridge that is the subject of the invention.
Figure 8:
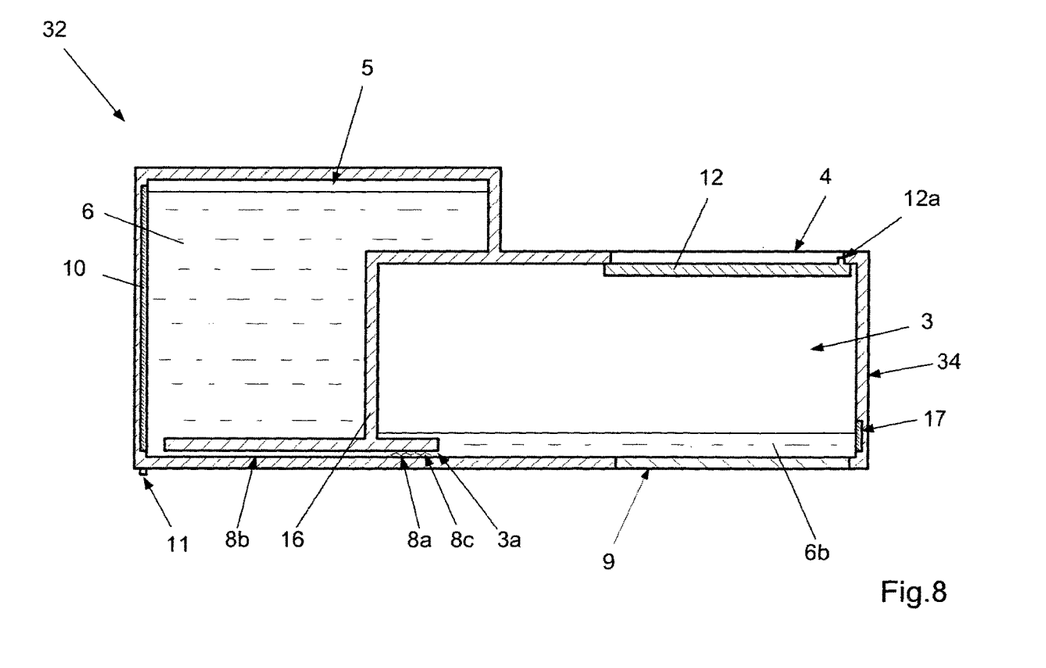
FIG. 8 shows a side sectional view of the cartridge shown in FIG. 7.

According to a variant embodiment of the invention, indicated by 32 in FIGS. 7 and 8, the conveyance ducts 8a end into the container 3 at the level of a common dispensing mouth 3a.

Advantageously, said common dispensing mouth facilitates the mixing of the materials 6, 6a while they are transferred towards the container 3.

Furthermore, preferably, the feeding means 8 comprise a mixing duct 8b with one end connected to the second ends of the conveyance ducts 8a and with the opposite end coinciding with the dispensing mouth 3a, which houses a shaped body 8c configured so as to induce a vortex motion in the materials 6, 6a that flow along the mixing duct itself.

Advantageously, said shaped body 8c favours the mixing of the materials during the dispensing step.

Preferably but not necessarily the shaped body 8c is in the shape of a spiral.

Figure 9:
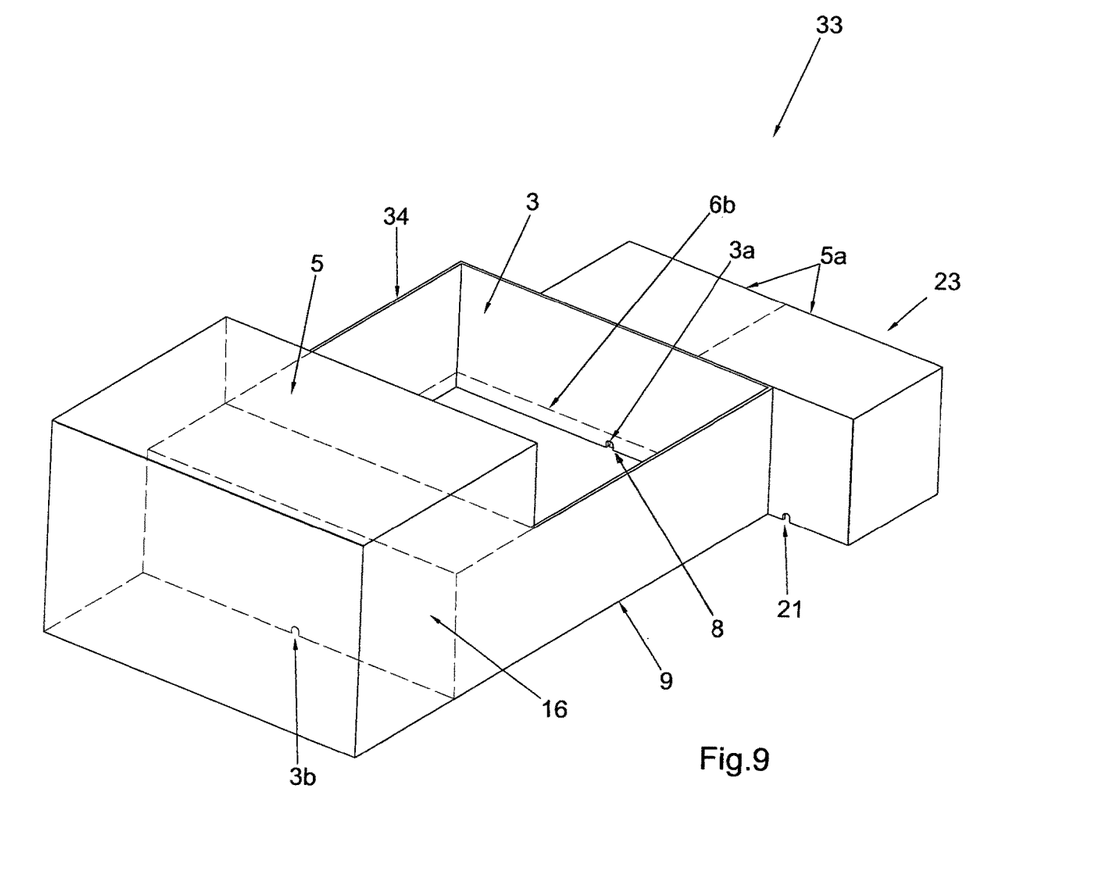
FIG. 9 shows a partial axonometric section view of a fourth variant embodiment of the cartridge that is the subject of the invention.

In a further variant embodiment of the invention, indicated by 33 in FIG. 9, the two second reservoirs 5a belong to a distribution unit 23 removably associated with the container 3 at the level of the dispensing mouth 3a of the latter.

Each one of the second reservoirs 5a comprises a corresponding opening 21 and the distribution unit 23 is configured in such a way that its movement makes it possible to arrange any one of said openings 21 at the level of the dispensing mouth 3a of the container 3.

In this way, it is possible to select the material to convey to the container 3 through a different arrangement of the distribution unit 23.

The first reservoir 5 is fixed to the container 3 and communicates with it through a dispensing mouth 3b that is preferably but not necessarily distinct from the dispensing mouth 3a corresponding to the second reservoirs 5a.

Obviously, according to variant embodiments of the invention, the first reservoir 5 may also belong to the distribution unit 23.

In the embodiment illustrated in FIG. 9, the distribution unit 23 has the configuration of a drawer associated with the supporting structure 34 through linear sliding guides, not illustrated herein but known per se.

Different embodiments of the invention may include distribution units that are different from the one described above and, for example, may assume the configuration of a rotating drum or any other configuration.

Operatively, the cartridge 2 is used in a stereolithography machine 1, schematically illustrated in FIG. 4, which comprises emitter means 13 suited to emit the predefined radiation 7 and a modelling platform 14 associated with power means suited to move it along a movement trajectory X.

Preferably, the cartridge 2 is associated with the machine 1 in such an operating position that the transparent bottom 9 of the container 3 is arranged along the trajectory of the predefined radiation 7 and that the access opening 4 is arranged along the trajectory of movement X of the platform 14.

Preferably, the connection means 15 are provided with sensors, not illustrated herein but known per se, suited to detect the presence of the cartridge 2 and to indicate, if necessary, any positioning defect, thus further improving ease of use of the system as a whole.

When the cartridge 2 is in the operating position, the door 12 of the container 3 is opened, preferably automatically, in order to allow the modelling platform 14 to enter the container 3.

The three-dimensional object is produced using a stereolithography process of the known type, after transferring a predefined quantity of one or more materials 6, 6a from the reservoirs 5, 5a to the container 3.

The container 3 will thus contain the material 6 or the material 6a, or a mixture 6b of these.

Successively, the modelling platform 14 is arranged in contact with the material 6, 6a or 6b present in the container 3.

A layer of the material 6, 6a or 6b arranged in contact with the modelling platform 14 is then selectively irradiated with the predefined radiation 7, in such a way as to cause it to solidify.

Each layer of the object can be made with any of the materials 6, 6a that from time to time are transferred from the reservoirs 5, 5a to the container 3.

In the case where the layers are made starting from a mixture 6b of the different materials 6 and 6a, the homogeneous mixing of the materials 6, 6a can take place directly while the same are being dispensed, for example by conveying them through a single dispensing mouth 3a as in the variant embodiment 32 shown in FIGS. 7 and 8.

According to a variant embodiment not illustrated in the figures, the materials 6, 6a are mixed after they have been conveyed into the container 3 and before being exposed to the predefined radiation 7.

In this last variant embodiment, said mixing is preferably obtained by moving the modelling platform 14 with respect to the container 3, in contact with the materials 6, 6a contained therein.

Preferably, the movement of the platform 14 is parallel to the bottom 9 of the container 3, for example comprises a series of complete rotations of the platform 14 around an axis orthogonal to the bottom 9 itself, preferably coinciding with the movement trajectory X of the platform 14.

In this case, the platform 14 preferably has a circular shape.

Furthermore, the machine 1 preferably comprises a detection device, not illustrated herein, capable of determining the angular orientation of the platform 14 so that, at the end of said rotation, the platform 14 is brought back to its initial position.

Said detection device preferably comprises a reference element belonging to the platform 14 and a detection element that is external to the platform itself.

Preferably, the reference element is a lateral notch and the detection element is a reference body cooperating with said lateral notch and having also the function of locking the platform 14 in the correct position.

At the end of the processing cycle, the modelling platform 14 and, together with it, the finished object, are extracted from the container 3.

Preferably, the removable door 12 of the container 3 is closed in such a way as to protect the materials 6, 6a remained in the cartridge 2 from the atmospheric agents, so that they can be used again at a later moment.

The stereolithography machine 1 can be configured so that before starting a successive processing cycle it warns the operator if the level of the materials 6, 6a present in the reservoirs 5, 5a is below a predefined threshold.

According to a variant embodiment, the stereolithography machine 1 is configured so that it can calculate the quantity of material necessary to make the object, comparing it with the quantity of material 6, 6a available in the reservoirs 5, 5a.

If the available quantity is not sufficient, the stereolithography machine 1 warns the user.

The above clearly shows that the cartridges described above achieve the set objects.

In particular, the presence of several reservoirs in the same cartridge for containing different materials makes it possible to produce three-dimensional objects with different physical characteristics and/or comprising several different materials in a simple and automated way.

Furthermore, the cartridge-shaped configuration allows the operator to avoid having to periodically top up and/or empty the cartridge's container.

Furthermore, easy connection and removal of the cartridge to/from the machine facilitate replacement when the bottom of the container becomes opaque.

Said ease of use is further enhanced by the presence of means for detecting the level of the material present in the reservoir.

Ease of use is also favoured by the fact that it is not necessary to wash the feeding system of the container, as the feeding system is incorporated in the cartridge and, therefore, is replaced together with the latter when it is necessary to change the materials.

Furthermore, the possibility to close the access opening of the cartridge makes it possible to preserve the materials contained therein, preventing their untimely deterioration.

The invention claimed is:
1. Stereolithography cartridge comprising:
a container provided with an access opening;
a first reservoir containing a first material, liquid or paste, to be cured through exposure to a predefined radiation, said first reservoir to insulate said first material from the external environment;
at least one second reservoir containing a second material, liquid or paste, different from said first material, said second reservoir to insulate said second material from the external environment;
feeding means to convey said first material and said second material from said reservoirs towards said container;
wherein said container, said first reservoir, said at least one second reservoir and said feeding means, are secured to a supporting structure to form a single unit removably connectable to a stereolithography machine, said first and second reservoirs being laterally juxtaposed and are located at one end of the container; and wherein said second material is curable through exposure to said predefined radiation and/or forms, together with said first material, a mixture curable through exposure to said predefined radiation.

2. The stereolithography cartridge according to claim 1, wherein the cartridge comprises a plurality of further second reservoirs, each one being secured to said supporting structure and containing corresponding second materials different from one another.

3. The stereolithography cartridge according to claim 1, wherein said first reservoir and said at least one second reservoir are fixedly associated with said container.

4. The stereolithography cartridge according to claim 1, wherein said feeding means comprise conveyance ducts, each communicating at a first end respectively with said first reservoir or said at least one second reservoir and at an opposite second end with said container.

5. The stereolithography cartridge according to claim 4, wherein at least two of said conveyance ducts end into said container, at levels of different dispensing mouths.

6. The stereolithography cartridge according to claim 1, wherein said feeding means is configured to keep a level of the material contained in said container within a predefined interval.

7. The stereolithography cartridge according to claim 1, wherein said feeding means comprise valve means controllable to allow or prevent the outflow of said first material and/or of said second material from a corresponding reservoir towards said container.

8. The stereo lithography cartridge according to claim 1, wherein said feeding means comprise a thrusting device to thrust said first material and/or said second material from the corresponding reservoir towards said container.

9. The stereolithography cartridge according to claim 1, wherein said container comprises a bottom at least partially transparent to said predefined radiation, located opposite said access opening.

10. The stereolithography cartridge according to claim 1, wherein said first material is a light-curing resin or a photopolymer.

11. The stereolithography cartridge according to claim 1, wherein said feeding means comprises one of a valve device and a thrust device to control movement of the first and second materials from the reservoirs to the container.

12. Stereolithography cartridge comprising:
a container provided with an access opening;
a first reservoir containing a first material, liquid or paste, to be cured through exposure to a predefined radiation, said first reservoir to insulate said first material from the external environment;
at least one second reservoir containing a second material, liquid or paste, different from said first material, said second reservoir to insulate said second material from the external environment;
feeding means to convey said first material and said second material from said reservoirs towards said container;
wherein said container, said first reservoir, said at least one second reservoir and said feeding means, are secured to a supporting structure to form a single unit removably connectable to a stereolithography machine; and
wherein said second material is curable through exposure to said predefined radiation and/or forms, together with said first material, a mixture curable through exposure to said predefined radiation, wherein said feeding means comprise conveyance ducts, each communicating at a first end respectively with said first reservoir or said at least one second reservoir and at an opposite second end with said container, and wherein at least two of said conveyance ducts end into said container at a level of a same dispensing mouth.

13. The stereolithography cartridge according to claim 12, wherein said feeding means comprise a mixing duct that has one end connected to a second end of each of said conveyance ducts and an opposite end coinciding with said dispensing mouth, said mixing duct housing a shaped body configured to induce a vortex motion in the material that flows along said mixing duct.

14. Stereolithography cartridge comprising:
a container provided with an access opening;
a first reservoir containing a first material, liquid or paste, to be cured through exposure to a predefined radiation, said first reservoir to insulate said first material from the external environment;
at least one second reservoir containing a second material, liquid or paste, different from said first material, said second reservoir to insulate said second material from the external environment;
feeding means to convey said first material and said second material from said reservoirs towards said container;
wherein said container, said first reservoir, said at least one second reservoir and said feeding means, are secured to a supporting structure to form a single unit removably connectable to a stereolithography machine; and
wherein said second material is curable through exposure to said predefined radiation and/or forms, together with said first material, a mixture curable through exposure to said predefined radiation, wherein said feeding means comprise a dispensing mouth communicating with said container, each of said first reservoir and said at least one second reservoir comprising a respective opening and belonging to a distribution unit removably associated with said container to selectively place said opening of said first reservoir or said opening of said at least one second reservoir in communication with said dispensing mouth.

15. Stereolithography cartridge comprising:
a container provided with an access opening;
a first reservoir containing a first material, liquid or paste, to be cured through exposure to a predefined radiation, said first reservoir to insulate said first material from the external environment;
at least one second reservoir containing a second material, liquid or paste, different from said first material, said second reservoir to insulate said second material from the external environment;
feeding means to convey said first material and said second material from said reservoirs towards said container;
wherein said container, said first reservoir, said at least one second reservoir and said feeding means, are secured to a supporting structure to form a single unit removably connectable to a stereolithography machine; and
wherein said second material is curable through exposure to said predefined radiation and/or forms, together with said first material, a mixture curable through exposure to said predefined radiation, wherein the cartridge comprises a door removably associated with said access opening to assume a position where said access opening remains open and a position where the cartridge closes said access opening.

\* \* \* \* \*